(12) United States Patent
Bonkowski et al.

(10) Patent No.: US 11,713,067 B1
(45) Date of Patent: Aug. 1, 2023

(54) AXIALLY ADJUSTABLE TELESCOPING STEERING SHAFT ASSEMBLY

(71) Applicant: Steering Solutions IP Holding Corporation, Saginaw, MI (US)

(72) Inventors: Jeremy A. Bonkowski, Freeland, MI (US); Jeremy M. Zemla, Owosso, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/585,014

(22) Filed: Jan. 26, 2022

(51) Int. Cl.
*B62D 1/185* (2006.01)

(52) U.S. Cl.
CPC ........ *B62D 1/185* (2013.01); *B60Y 2410/102* (2013.01)

(58) Field of Classification Search
CPC .......................... B62D 1/185; B60Y 2410/102
See application file for complete search history.

(56) References Cited

U.S. PATENT DOCUMENTS

2021/0229733 A1* 7/2021 Kurokawa ............. B62D 1/184

FOREIGN PATENT DOCUMENTS

| CN | 101480966 A | * | 7/2009 | ............ B62D 1/185 |
| CN | 102806938 A | * | 12/2012 | ............ B62D 1/16 |
| CN | 106585704 A | * | 4/2017 | ............ B62D 1/06 |
| CN | 110406586 A | * | 11/2019 | |
| CN | 112109796 A | * | 12/2020 | ............ B62D 1/185 |
| CN | 113329930 A | * | 8/2021 | ............ B62D 1/181 |
| DE | 19820291 B4 | * | 6/2006 | ............ B62D 1/185 |
| DE | 102019007741 A1 | * | 5/2021 | |
| WO | WO-0119662 A1 | * | 3/2001 | ............ B62D 1/185 |
| WO | WO-2016114034 A1 | * | 7/2016 | ............ B62D 1/184 |
| WO | WO-2020216819 A1 | * | 10/2020 | ............ B62D 1/184 |

* cited by examiner

*Primary Examiner* — Drew J Brown
(74) *Attorney, Agent, or Firm* — Dickinson Wright PLLC

(57) ABSTRACT

An axially adjustable steering column assembly includes a first jacket and a second jacket, wherein the first jacket is axially adjustable relative to the second jacket. The steering column assembly also includes a steering shaft assembly disposed within the first jacket and the second jacket. The steering shaft assembly includes first shaft. The steering shaft assembly also includes a second shaft in contact with the first shaft. The steering shaft assembly further includes a third shaft in contact with the second shaft, wherein the first, second and third shaft are axially adjustable relative to each other.

9 Claims, 4 Drawing Sheets

AXIALLY ADJUSTABLE TELESCOPING STEERING SHAFT ASSEMBLY

FIELD OF THE INVENTION

The embodiments described herein relate to vehicle steering systems and, more particularly, to an axially adjustable telescoping steering shaft assembly.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions. In the past, a function of axially adjustable steering columns was to provide flexibility in the location of the hand wheel and facilitate more comfortable driving positions for different sizes of drivers. However, now there are opportunities for significantly more telescopic travel, which also may be referred to as stow travel (i.e., when the hand wheel is not needed). For example, the hand wheel could be repositioned further away from the driver to allow him or her to do things other than operate the vehicle, such as work on a laptop computer when the vehicle is parked. Other examples include vehicles with autonomous driving capability, such that the hand wheel could be stowed when the vehicle is in an autonomous driving mode.

Steering column assemblies that are moved significantly to a stowed position may be very long. The significant length of a steering column presents packaging challenges. A limiting factor in designing stowable steering columns is the shaft line of a steering shaft assembly, as the internal collapse distance of the shaft line must allow for motion along a full distance of stow travel. Addressing the above-described packaging challenges would be well received in the industry for steering columns that require full stow capability.

SUMMARY

According to one aspect of the disclosure, an axially adjustable steering column assembly includes a first jacket and a second jacket, wherein the first jacket is axially adjustable relative to the second jacket. The steering column assembly also includes a steering shaft assembly disposed within the first jacket and the second jacket. The steering shaft assembly includes first shaft. The steering shaft assembly also includes a second shaft in contact with the first shaft. The steering shaft assembly further includes a third shaft in contact with the second shaft, wherein the first, second and third shaft are axially adjustable relative to each other.

According to another aspect of the disclosure, a steering shaft assembly disposed within a jacket assembly in a vehicle steering system. The steering shaft assembly includes a first shaft. The steering shaft assembly also includes a second shaft, wherein the first shaft and the second shaft are axially adjustable relative to each other. The steering shaft assembly further includes a third shaft, wherein the first shaft, wherein the second shaft and the third shaft are axially adjustable relative to each other, wherein the first shaft, the second shaft and the third shaft share a common axial, longitudinal axis.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
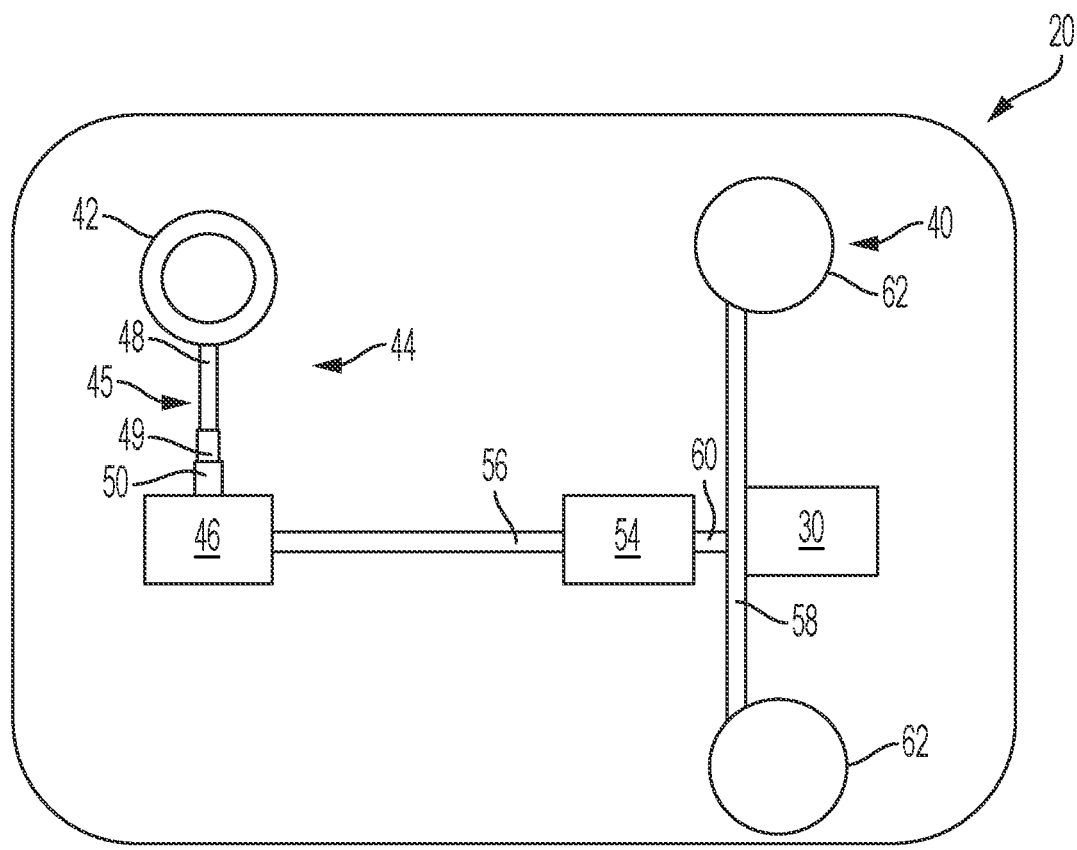
FIG. 1 generally illustrates a vehicle with a steering system for a vehicle.

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions. In the past, a function of axially adjustable steering columns was to provide flexibility in the location of the hand wheel and facilitate more comfortable driving positions for different sizes of drivers. However, now there are opportunities for significantly more telescopic travel, which also may be referred to as stow travel (i.e., when the hand wheel is not needed). For example, the hand wheel could be repositioned completely away from the driver to allow him or her to do things other than operate the vehicle, such as work on a laptop computer when the vehicle is parked. Other examples include vehicles with autonomous driving capability, such that the hand wheel could be stowed when the vehicle is in an autonomous driving mode. For a significantly greater amount of telescopic and stow capacity, conventional steering column solutions will not package between the rear of dash and the front of dash for any normal passenger vehicle.

Referring now to the drawings, where the various embodiments are shown and described herein, without limiting same, FIGS. 1-6 illustrate embodiments of a steering column assembly that is axially adjustable with improved packaging and other operational benefits. The axial adjustability results from relative movement between two or more steering column portions (e.g. jackets, brackets, rails, and/or the like) that permit axial movement therebetween, in combination with relative movement between multiple steering shaft portions that permit axial movement therebetween. Axial movement refers to movement resulting from relative telescopic, sliding, or translational movement between components.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an ignition system, an electronic system, or combinations thereof.

In some embodiments, the vehicle 20 may further include a steering system 40. The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. A steering column assembly 44 includes a steering column 45 that extends along an axis from the input device 42 to an output assembly 46. The output assembly 46 may include a pinion shaft assembly, an I-shaft, a cardan joint, steer-by-wire components or any feature conventionally located opposite the input device 42.

The steering column 45 may include at least two axially adjustable portions, for example, a first portion 48 and a second portion 50 that are axially adjustable with respect to one another. The at least two axially adjustable portions may further include at least one third portion 49 that is disposed between the first portion 48 and the second portion 50 in some embodiments. The first portion 48 and the second portion 50 may be configured as jackets, such as an upper jacket and a lower jacket, respectively. It is to be appreciated that other structural features of the steering column 45 may be the first portion 48 and the second portion 50, such as brackets, rails, other devices, or combinations thereof. The axial movement may include sliding, telescopic, translating, other axial movements, or combinations thereof.

Figure 2:
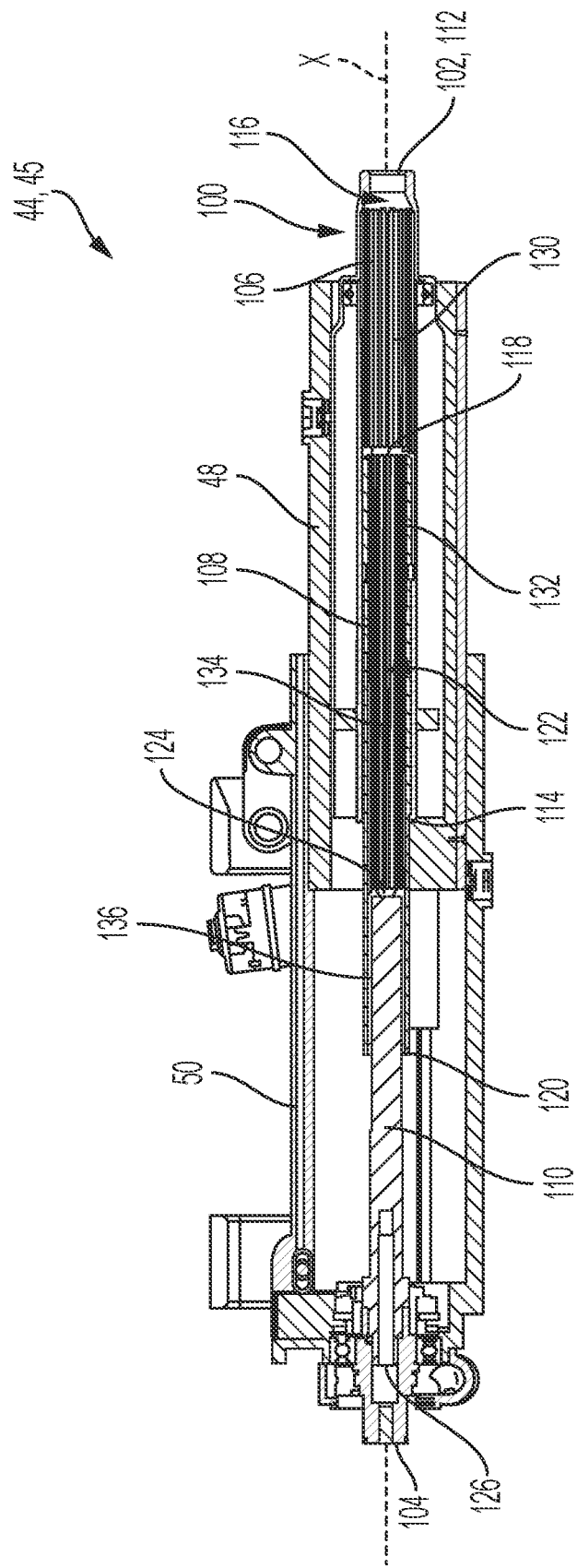
FIG. 2 is an elevational, cross-sectional view of a steering column of the steering system in an extended position.
Figure 3:
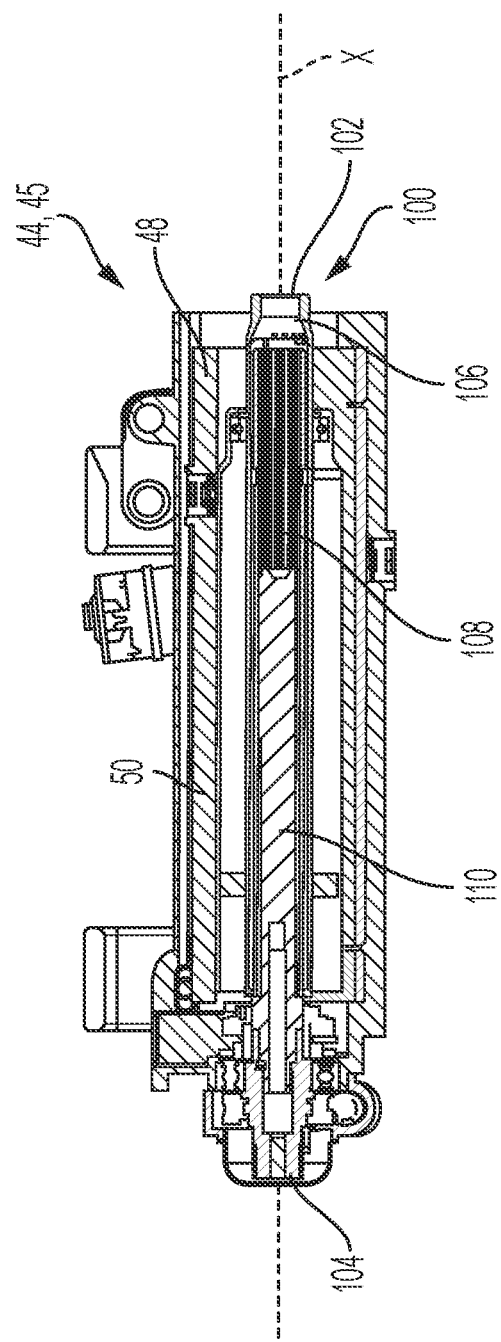
FIG. 3 is an elevational, cross-sectional view of the steering column in a retracted position.

The steering column 45 is moveable between a range of positions from an extended position (FIG. 2) to a retracted position (FIG. 3). In the extended position, the first portion 48 is moved axially with respect to the second portion 50 so that the input device 42 is located near an operator of the vehicle. In the retracted position, the first portion 48 is moved axially with respect to the second portion 50 so that the input device 42 is located further away from an operator of the vehicle, when compared to the extended position. In some embodiments, the retracted position may correspond to stowing the input device 42. For example, it may be beneficial to place the input device 42 in a stowed location during autonomous driving. In operation, the axial movement between the first portion 48 and the second portion 50 may be effectuated by manual movement by an operator or electromechanically by a telescope actuator. This axial movement adjusts between the extended position, the retracted position, and any intermediary positions.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear and/or various traditional components. The output shaft 60 is operably connected to the steering gear assembly 54 such that a rotation of the steering gear input shaft 56 causes a responsive movement of the output shaft 60 and causes the drive axle to turn wheels 62.

With reference now to FIGS. 2 and 3, the steering column assembly 44 is illustrated in greater detail. In particular, the first jacket 48 and the second jacket 50 are shown relative to each other in an extended position (FIG. 2) and a retracted—or stowed—position (FIG. 3). As shown, one or more actuator assemblies may be included to facilitate various movements of the steering column 45, such as rake or tilt adjustment. Additionally, in the embodiments disclosed herein the steering column is axially adjustable to move the steering column 45 between the extended position and the retracted position. The axial adjustment may be carried out manually by an operator in some embodiments or may be done electromechanically with an actuator. In the illustrated embodiment, the first jacket 48 is an upper jacket and the second jacket 50 is a lower jacket, and the first jacket 48 is telescopically received by the second jacket 50 during axial adjustment of the steering column 45.

The steering column 45 includes a steering shaft assembly 100 and extends therewith along a longitudinal axis X. The steering column 45 is partially enclosed within the upper and lower jackets 48, 50 and extends between a first end 102 (e.g. upper end) and a second end 104 (e.g. a lower end). The steering shaft assembly 100 includes three or more shafts that are axially adjustable relative to each other during axial movement of the overall steering column 45.

In the illustrated embodiment, the steering shaft assembly 100 includes a first shaft 106, a second shaft 108 and a third shaft 110. The first shaft 106 extends from a first end 112 to a second end 114, with the first end 112 of the first shaft 106 corresponding to the first end 102 of the steering column 45 in some embodiments. The input device 42, such as a steering wheel, is operatively coupled to the first end 112 of the first shaft 106 in some embodiments. The first shaft 106 defines a first bore 116, with the second end 114 of the first shaft 106 defining an opening leading to the first bore 116. The second shaft 108 extends from a first end 118 to a second end 120. The second shaft 108 defines a second bore 122, with the second end 120 of the second shaft 108 defining an opening leading to the second bore 122. The third shaft 110 extends from a first end 124 to a second end 126.

As shown, a portion of the second shaft 108 is disposed within the first bore 116 of the first shaft 106. In particular, a portion of the second shaft 108 extending from the first end 118 of the second shaft 108 toward the second end 120 of the second shaft 108 is disposed within the first bore 116. Similarly, a portion of the third shaft 110 is disposed within the second bore 122 of the second shaft 108. In particular, a portion of the third shaft 110 extending from the first end 124 of the third shaft 110 toward the second end 126 of the third shaft 110 is disposed within the second bore 122.

The contact or coupling between the first shaft 106 and the second shaft 108 may be made with direct contact between the shafts 106, 108 or indirect contact (e.g., coupling joint). In the illustrated embodiments, a direction connection is made with a splined interface. In particular, the first bore 116 includes a first bore plurality of splines 130 and the second shaft includes a plurality of second shaft external splines 132 in contact with the first bore plurality of splines 130. Similarly, while the contact or coupling between the second shaft 108 and the third shaft 110 may be made directly or indirectly, the illustrated embodiments show a direction connection being made with a splined interface. In particular, the second bore 122 includes a second bore plurality of splines 134 and the third shaft 110 includes a plurality of third shaft external splines 136 in contact with the second bore plurality of splines 134. The splined connections ensure that the shafts 106, 108, 110 of the steering shaft assembly 110 rotate together, while still allowing the telescoping, axial movement therebetween.

In operation, the second shaft 108 has a larger portion thereof disposed within the first bore 116 during movement of the steering column 45 from the extended position (FIG. 2) to the stowed position (FIG. 3). Similarly, the third shaft 110 has a larger portion thereof disposed within the second bore 122 during movement of the steering column 45 from the extended position to the stowed position. In other words, the steering shaft assembly 100 collapses to a significantly shorter length during movement from the extended position to the stowed position, while maintaining all of the shafts (or shaft segments) in the same shaft line (i.e., longitudinal shaft axis). Therefore, the full stow travel range is accommodated, while providing a shorter axial package.

While the steering shaft assembly 100 is illustrated and described above as having the third shaft 110 disposed within the second shaft 108, and the second shaft 108 within the first shaft 106, it is contemplated that the reverse may be true. Specifically, the first shaft 106 may telescope within the second shaft 108, and the second shaft 108 may telescope within the third shaft 110 in some embodiments.

Figure 4:
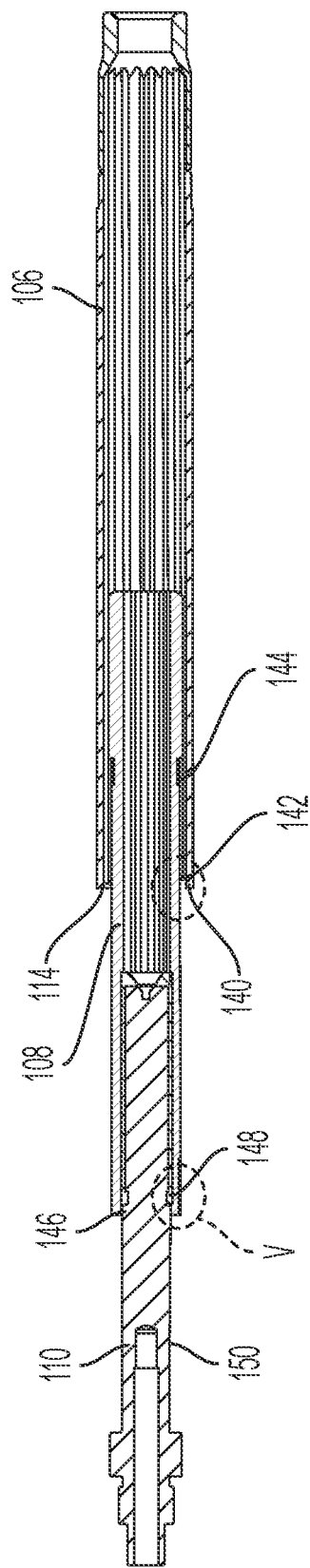
FIG. 4 is an elevational, cross-sectional view of a steering shaft assembly of the steering column.
Figure 5:
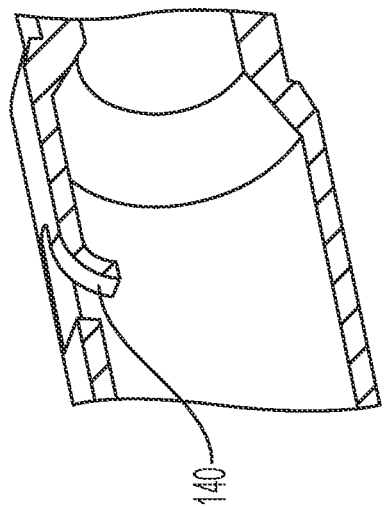
FIG. 5 is an enlarged view of Section V of FIG. 4 illustrating a travel stop feature of the steering shaft assembly.

Referring now to FIGS. 4 and 5, stop or retention features of the steering shaft assembly 100 are illustrated. Specifically, the first shaft 106 includes a first shaft stop feature 140 proximate the second end 114 of the first shaft 106. The first shaft stop feature 140 projects radially inwardly, relative to the first bore 116 and longitudinal axis of the steering shaft assembly 100. The second shaft 108 includes a second shaft projection 142 extending radially outwardly from an outer surface 144 of the second shaft 108 to contact the first shaft stop feature 140 to define an axial stop position of the second shaft 108 relative to the first shaft 106. Similarly, the second shaft 108 includes a second shaft stop feature 146 proximate the second end 120 of the second shaft 108. The second shaft stop feature 146 projects radially inwardly, relative to the second bore 122 and longitudinal axis of the steering shaft assembly 100. The third shaft 110 includes a third shaft projection 148 extending radially outwardly from an outer surface 150 of the third shaft 110 to contact the second shaft stop feature 146 to define an axial stop position of the third shaft 110 relative to the second shaft 108.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. An axially adjustable steering column assembly comprising:
    a first jacket;
    a second jacket, wherein the first jacket is axially adjustable relative to the second jacket; and
    a steering shaft assembly disposed within the first jacket and the second jacket, the steering shaft assembly comprising:
        a first shaft;
        a second shaft in contact with the first shaft, wherein the first shaft extends from a first shaft first end to a first shaft second end, wherein the first shaft defines a first opening at the first shaft second end and a first shaft bore extending from the first opening, wherein the second shaft extends from a second shaft first end to a second shaft second end, wherein the second shaft defines a second opening at the second shaft second end and a second shaft bore extending from the second opening, wherein the second shaft first end is disposed within the first shaft bore, wherein the first shaft includes a first shaft stop feature axially spaced from the first shaft second end, the first shaft stop feature projecting radially inwardly, wherein the second shaft includes a second shaft projection extending radially outwardly from an outer surface of the second shaft to contact the first shaft stop feature to define an axial stop position of the second shaft relative to the first shaft; and
        a third shaft in contact with the second shaft, wherein the first, second and third shaft are axially adjustable relative to each other.

2. The axially adjustable steering column assembly of claim 1, wherein the third shaft extends from a third shaft first end to a third shaft second end, wherein the third shaft first end is disposed within the second shaft bore.

3. The axially adjustable steering column assembly of claim 2, wherein the first jacket is axially adjustable between an extended position and a stowed position, wherein the second shaft has a larger portion thereof disposed within the first shaft bore during movement from the extended position to the stowed position.

4. The axially adjustable steering column assembly of claim 2, wherein the first jacket is axially adjustable between an extended position and a stowed position, wherein the third shaft has a larger portion thereof disposed within the second shaft bore during movement from the extended position to the stowed position.

5. The axially adjustable steering column assembly of claim 2, wherein the first jacket is axially adjustable between an extended position and a stowed position, wherein the second shaft has a larger portion thereof disposed within the first shaft bore during movement from the extended position to the stowed position, and wherein the third shaft has a larger portion thereof disposed within the second shaft bore during movement from the extended position to the stowed position.

6. The axially adjustable steering column assembly of claim 2, wherein the second shaft includes a second shaft stop feature proximate the second shaft second end that projects radially inwardly, wherein the third shaft includes a third shaft projection extending radially outwardly from an outer surface of the third shaft to contact the second shaft stop feature to define an axial stop position of the third shaft relative to the second shaft.

7. The axially adjustable steering column assembly of claim 2, wherein the first shaft bore includes a first bore plurality of splines and the second shaft includes a plurality of second shaft external splines in contact with the first bore plurality of splines.

8. The axially adjustable steering column assembly of claim 2, wherein the second shaft bore includes a second bore plurality of splines and the third shaft includes a plurality of third shaft external splines in contact with the second bore plurality of splines.

9. The axially adjustable steering column assembly of claim 1, wherein a hand wheel is operatively coupled to the first shaft first end.

\* \* \* \* \*